(12) United States Patent
Tanamoto et al.

(10) Patent No.: US 10,298,407 B2
(45) Date of Patent: May 21, 2019

(54) DATA GENERATION APPARATUS, ELECTRONIC DEVICE, AND AUTHENTICATION SYSTEM

(71) Applicant: Kabushiki Kaisha Toshiba, Minato-ku (JP)

(72) Inventors: Tetsufumi Tanamoto, Kawasaki (JP); Shinobu Fujita, Koto (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 215 days.

(21) Appl. No.: 15/256,783

(22) Filed: Sep. 6, 2016

(65) Prior Publication Data
US 2017/0272258 A1 Sep. 21, 2017

(30) Foreign Application Priority Data
Mar. 16, 2016 (JP) .................................. 2016-052727

(51) Int. Cl.
*H04L 9/32* (2006.01)
*G11C 11/16* (2006.01)
*H04L 9/08* (2006.01)

(52) U.S. Cl.
CPC ........ *H04L 9/3278* (2013.01); *G11C 11/1673* (2013.01); *G11C 11/1675* (2013.01); *H04L 9/0866* (2013.01)

(58) Field of Classification Search
CPC ........ G06F 21/73; G06F 21/86; G06F 3/0601; H04L 9/3278
See application file for complete search history.

(56) References Cited

U.S. PATENT DOCUMENTS

| 5,369,608 | A | * | 11/1994 | Lim | ................... | G11C 16/0483 |
| | | | | | | 365/182 |
| 6,760,472 | B1 | | 7/2004 | Takeda et al. | | |
| 8,854,866 | B2 | | 10/2014 | Huber et al. | | |
| 9,088,278 | B2 | | 7/2015 | Pfeiffer et al. | | |
| 9,948,471 | B2 | * | 4/2018 | Katoh | ................... | H04L 9/3278 |

(Continued)

FOREIGN PATENT DOCUMENTS

| JP | 2000-235636 A | 8/2000 |
| JP | 2012-73954 A | 4/2012 |

(Continued)

OTHER PUBLICATIONS

Jorge Guajardo et al., "FPGA Intrinsic PUFs and Their Use for IP Protection", CHES 2007 LNCS, vol. 4727 /2007, 2007, pp. 63-80,.

(Continued)

*Primary Examiner* — Ali S Abyaneh
(74) *Attorney, Agent, or Firm* — Oblon, McClelland, Maier & Neustadt, L.L.P.

(57) ABSTRACT

A data generation apparatus according to an embodiment comprises a memory space including a plurality of memory cells, each including a resistance change element, a first circuit configured to supply the memory cells included in a first space that represents part of the memory space with a current or a voltage that causes a dielectric breakdown to occur in the resistance change element, a second circuit configured to output a value read from the memory cells included in the first space, and an ID generation circuit configured to generate an ID using the value output from the second circuit.

9 Claims, 10 Drawing Sheets

(56) References Cited

U.S. PATENT DOCUMENTS

| | | |
|---|---|---|
| 2012/0002045 A1 | 1/2012 | Tony et al. |
| 2013/0145164 A1* | 6/2013 | Nagai ................. H04L 9/0816 |
| | | 713/171 |
| 2014/0372671 A1 | 12/2014 | Tanamoto et al. |
| 2015/0070979 A1 | 3/2015 | Zhu et al. |
| 2015/0071430 A1 | 3/2015 | Zhu et al. |
| 2015/0071432 A1 | 3/2015 | Zhu et al. |
| 2015/0074433 A1* | 3/2015 | Zhu ........................ G06F 1/26 |
| | | 713/300 |
| 2016/0085961 A1 | 3/2016 | Tanamoto et al. |
| 2016/0277025 A1 | 9/2016 | Tanamoto et al. |

FOREIGN PATENT DOCUMENTS

| | | |
|---|---|---|
| JP | 2013-131869 A | 7/2013 |
| JP | 2015-1761 A | 1/2015 |
| JP | 2015-127757 A | 7/2015 |
| JP | 2016-63457 A | 4/2016 |
| JP | 2016-174279 A | 9/2016 |

OTHER PUBLICATIONS

Hiroki Noguchi et al., "A 250-MHz 256b-I/O 1-Mb STT-MRAM with Advanced Perpendicular MTJ Based Dual Cell for Nonvolatile Magnetic Caches to Reduce Active Power of Processors" , VLSI symposium 2013, pp. C108-C109.

Yiran Chen et al., "A Nondestructive Self-Reference Scheme for Spin-Transfer Torque Random Access Memory (STT-RAM)", EDAA, 2010, Paper presented at the Automation & Test in Europe Conference and Exhibition, Dresden, Germany.

* cited by examiner

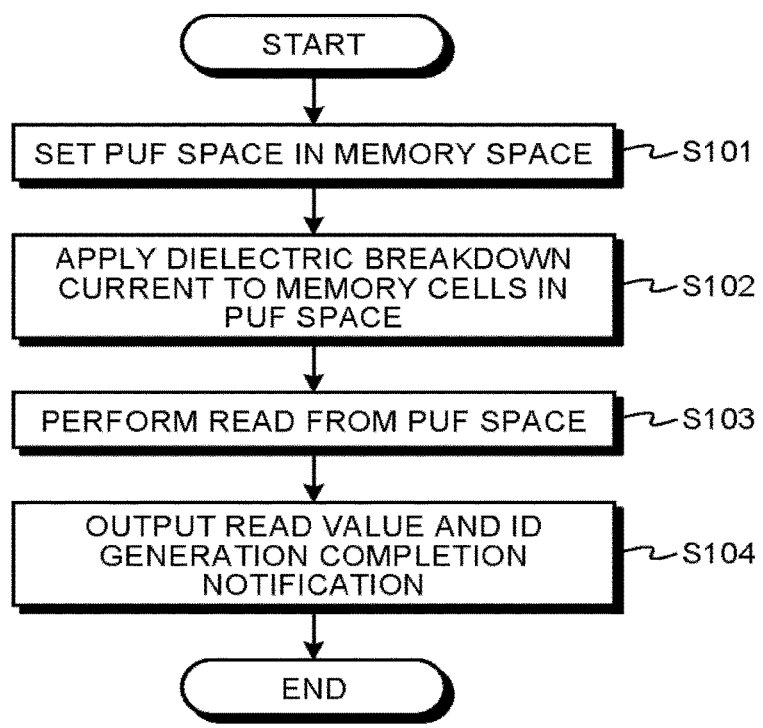

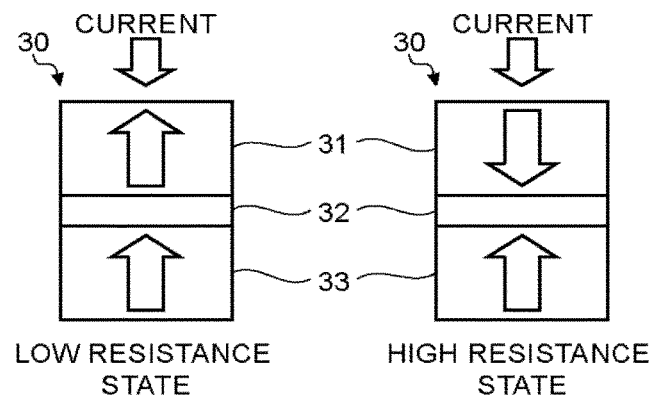
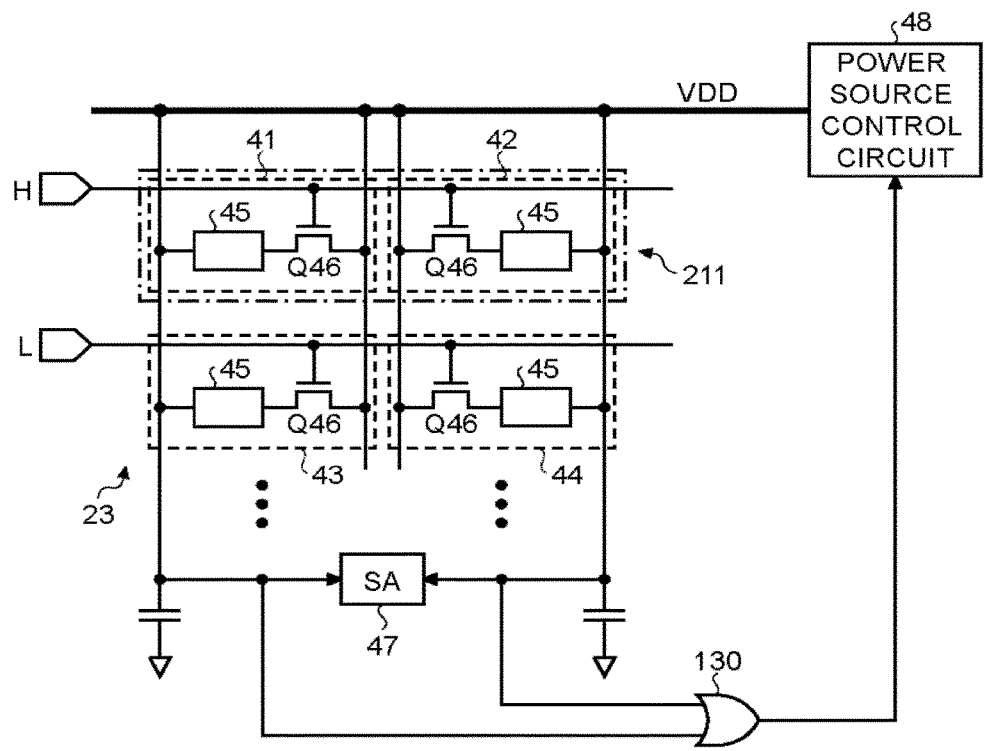

DATA GENERATION APPARATUS, ELECTRONIC DEVICE, AND AUTHENTICATION SYSTEM

CROSS-REFERENCE TO RELATED APPLICATIONS

This application is based upon and claims the benefit of priority from Japanese Patent Application No. 2016-052727, filed on Mar. 16, 2016; the entire contents of which are incorporated herein by reference.

FIELD

Embodiments described herein relate to a data generation apparatus, an electronic device, and an authentication system.

BACKGROUND

Faster communication speeds and advances made in cloud computing in recent years have resulted in burgeoning use of near-field type wireless communication (near field communication: NFC). The NFC is typically used as electronic money mounted on smartphones and smart cards used as, for example, tickets for trains and buses, in addition to cash cards, credit cards, and other IC cards. A need exists in the NFC for enhanced security in an ID identification function that identifies an individual.

A recent trend is toward mounting the ID identification function even in, for example, memory cards that have been used only for saving personal data and making the ID identification function mounted in portable devices even more sophisticated is a major challenge.

Against this background, research and development are underway to use part-to-part variations in devices for "chip's fingerprints". Such research is known as a physically unclonable function (PUF).

Among various types of PUFs, a static random access memory (SRAM)-PUF is being studied most. The SRAM-PUF represents a technique that uses variations in two inverters that constitute the SRAM occurring during manufacturing. A RAM-PUF[1-3] that is most popular among the various types of PUFs, in particular, is applied to the security IP and IC cards mentioned above. In addition, as a way of using the initial variations in electronic devices, applications of the PUF to a nonvolatile memory are also being studied.

BRIEF DESCRIPTION OF THE DRAWINGS

FIG. 3 is a flowchart schematically illustrating an ID generation process according to the first embodiment;

FIGS. 4A and 4B are diagrams for illustrating a direction of magnetization of an MTJ element;

FIG. 5 is a diagram for illustrating an exemplary operation performed by a sense amplifier that reads bits from a pair of memory cells according to a second embodiment;

DETAILED DESCRIPTION

Figure 1:
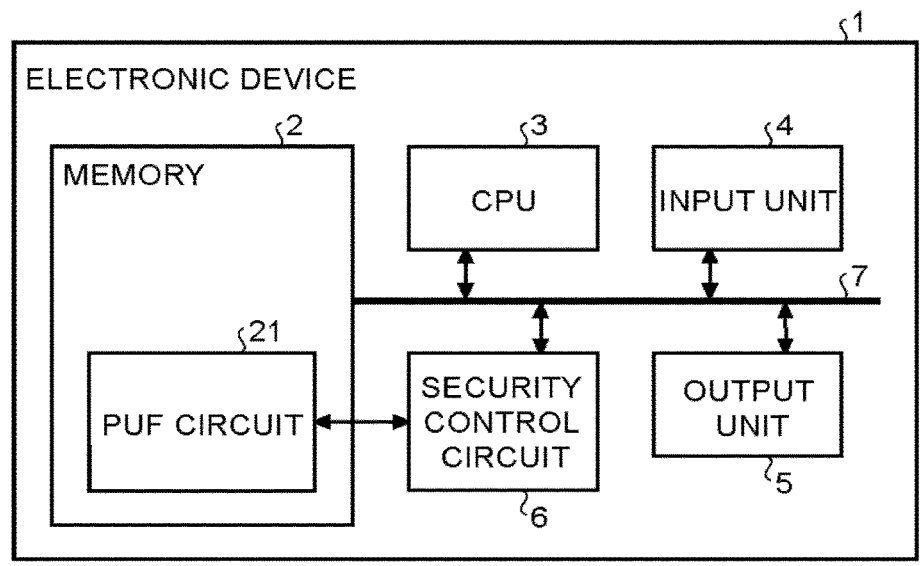
FIG. 1 is a block diagram of an exemplary schematic configuration of an electronic device according to a first embodiment.

The following details, with reference to the accompanying drawings, a data generation apparatus and an authentication system according to illustrative embodiments.

The basic approach in the PUF using an ordinary memory is to use the address of a memory cell that has developed an initial fault as a fingerprint. Thus, to use a 128-bit-length PUF, for example, 128 initial faults are required. Products are, however, designed and manufactured so as to eliminate faults as much as possible. To allow 128 faults to be precisely included in an address space to be used for the PUF, therefore, an address range to be made available for the PUF becomes wide, resulting, unfortunately, in a narrower range to be used for memory. It is indeed possible to use memory cells that remain intact and that are included in the address range made available for the PUF as an ordinary memory; however, the foregoing results in a PUF space and a memory space overlapping with each other. This undesirably augments complexity in design.

Meanwhile, a recently developed PUF uses a faulty spot of a memory using changes in electrical resistance. This technique enables use of various types of memories as the PUF, including a resistive random access memory (ReRAM), a ferroelectric random access memory (FeRAM), and a phase change element.

A magnetoresistive random access memory (MRAM) may also be used as the PUF by using variations thereof. The MRAM includes a magnetic resistive junction (MTJ) that uses changes in electrical resistance in two magnetic substances. Types of MRAMs developed in recent years include those using changes in voltage and spin-orbit interaction, in addition to the MRAM using two magnetic substances having different properties. In these types of MRAMs, data can be fetched, for example, by using a sense amplifier to read a difference in threshold voltage between two paired MTJ elements. The MRAM, however, has unstable characteristics by which threshold voltages between parallel and anti-parallel magnetizations depend on temperature and are affected by noise.

As described above, control has hitherto been difficult over variations in the MRAM for ordinary memory applications and memory characteristics and these two make a trade-off relation when the MRAM is used as the PUF. Specifically, enhancing reliability as the memory by reducing variations among memory cells leads to a wider address range of the memory cell to be made available for the PUF to compensate for the reliability enhancement, resulting substantially in a reduced memory space. Additionally, an attempt to use the memory space efficiently complicates the control.

Embodiments to be described below illustrate a data generation apparatus, an electronic device, and an authentication system that can accurately be used as a PUF even with minor variations in manufacturing by using resistance change elements as a pair.

First Embodiment

The following details, with reference to relevant accompanying drawings, a data generation apparatus, an electronic device, and an authentication system according to a first embodiment. Although an MTJ element is illustrated as a resistance change element used for the PUF, the MTJ element is illustrative only and not limiting. In addition to the MTJ element, a phase change memory, a FeRAM, a ReRAM, and any other common resistance change element may, for example, be applied. Additionally, with the MTJ element, in addition to a current-driven MTJ element illustrated below, a voltage-driven MTJ element in which the magnetization is changed by a voltage applied thereto may be used.

In a memory incorporating a common MTJ element, a predetermined voltage is applied to the MTJ element for ordinary read and write operations. A dielectric breakdown may occur in the MTJ element when the voltage is applied to the MTJ element for an unnecessarily long period of time or a current having a predetermined value or higher is passed through the MTJ element. For example, if a current having a value identical to a current value in an ordinary write operation is kept flowing for a microsecond or longer, a dielectric breakdown may occur in the MTJ element. Thus, a flow of a current more than necessary through all memory cells or application of a voltage higher than that in an ordinary operating mode to all memory cells causes the memory of ordinary use to be deteriorated. Thus, the current to be passed through or the voltage to be applied to the MTJ element has been limited for ordinary memory use. The restrictions on the current and voltage have also been effective in terms of power consumption.

In contrast, in the first embodiment, a portion for use as the PUF (hereinafter referred to as a PUF space or a first space) is set in part of a memory space and a current and/or a voltage that can cause a dielectric breakdown in the MTJ element is applied to this PUF space. As a result, memory cells in which the dielectric breakdown has occurred are produced at random in the PUF space. In the first embodiment, addresses of the memory cells in which the dielectric breakdown has occurred are used as chip fingerprints (IDs) for authentication.

At least one parameter is to be controlled for causing a dielectric breakdown to occur in the MTJ element, including, as described above, the value and the flow time of the current flowing through the MTJ element and the value and the application time of the voltage applied to the MTJ element.

FIG. 1 illustrates an exemplary schematic configuration of an electronic device according to the first embodiment. As illustrated in FIG. 1, this electronic device 1 includes a memory 2 that includes a PUF circuit 21, a central processing unit (CPU) 3, an input unit 4, an output unit 5, and a security control circuit 6. These elements are connected with each other via an internal bus 7.

The CPU 3 serves as a control unit that controls different parts of the electronic device 1. The input unit 4 may include a reception processor of a network interface and an input interface. The input unit 4 receives information input thereto from an external device of, for example, a server connected via a certain network such as the Internet, and from an input device such as a keyboard and a mouse. The input unit 4 inputs the foregoing information to the CPU 3 via the internal bus 7. The output unit 5 may include a transmission processor of the network interface and an output interface such as a display. The output unit 5 displays and transmits to the external device via the network information input from, for example, the CPU 3.

Figure 2:
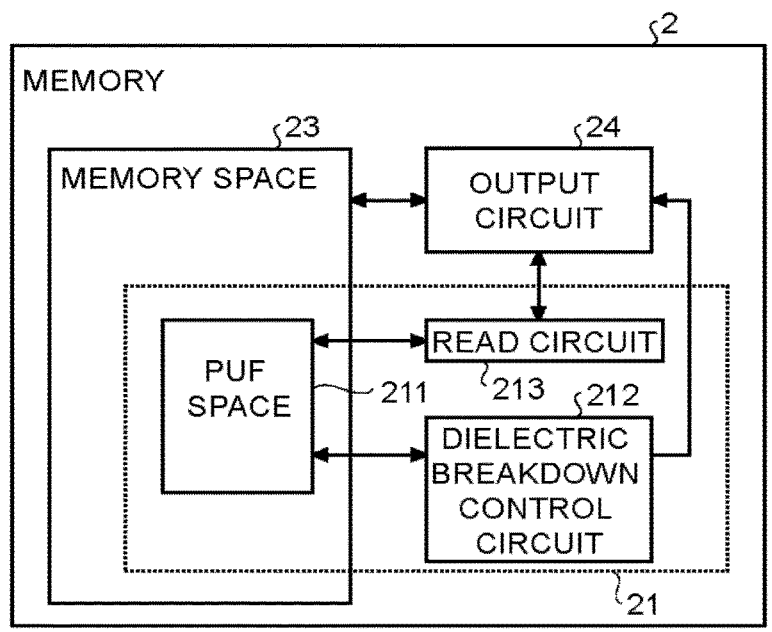
FIG. 2 is a block diagram of an exemplary schematic configuration of a memory in the first embodiment.

The security control circuit 6 instructs the PUF circuit 21 built in the memory 2 to generate and output an ID. The memory 2 may, for example, be a memory chip in which the MTJ element is used as a memory cell thereof. The memory 2 includes the PUF circuit 21 built therein. FIG. 2 illustrates an exemplary schematic configuration of the memory in the first embodiment.

As illustrated in FIG. 2, the memory 2 includes a memory space 23, a dielectric breakdown control circuit 212, a read circuit 213, and an output circuit 24. The memory space 23 includes a memory cell array in which a plurality of MTJ elements are arrayed. Part of the memory space 23 is used as a PUF space 211. The PUF space 211, the dielectric breakdown control circuit 212, and the read circuit 213 constitute the PUF circuit 21 described previously.

The dielectric breakdown control circuit 212, when, for example, an instruction output from the CPU 3 to generate an ID is input thereto via the security control circuit 6, applies to the PUF space 211 in the memory space 23 a current and/or a voltage satisfying a condition of causing a dielectric breakdown to occur in the MTJ element. This application causes the dielectric breakdown to occur in some MTJ elements of the PUF space 211. The address of the MTJ elements or the memory cells in which the dielectric breakdown occurs serves as a chip fingerprint (ID) of the memory 2. The ID can thus be read as a result of reading the PUF space 211.

The read circuit 213 reads the PUF space 211 after the dielectric breakdown and outputs the read ID to the security control circuit 6 via the output circuit 24. At this time, the read circuit 213 also notifies the security control circuit 6 of the dielectric breakdown, specifically, completion of generation of the ID. The security control circuit 6 inputs to the CPU 3 the ID input thereto and the notification of the completion of generation of the ID.

During authentication of the electronic device 1, the CPU 3 outputs as a command to the security control circuit 6 an input signal (a challenge) that serves as a trigger for starting the authentication. Upon receiving the input signal (the challenge), the security control circuit 6 accesses the PUF circuit 21 and acquires the ID from the read circuit 213 and returns the acquired ID to the CPU 3. The ID input to the CPU 3 is stored (as a response) via the output unit 5 by, for example, a server on the network. ID authentication is then performed through collation with changes in fault variations estimated on the server side.

The following describes, with reference to FIG. 3, an exemplary process for generating the ID according to the first embodiment. FIG. 3 is a flowchart schematically illustrating the ID generation process according to the first embodiment. FIG. 3 focuses on operations performed by the PUF circuit 21 that has received an instruction to generate the ID from the security control circuit 6.

Reference is made to FIG. 3. In the ID generation process, when the PUF circuit 21 receives the instruction to generate the ID from the security control circuit 6, the dielectric breakdown control circuit 212 sets part of a space of the memory space 23 as the PUF space 211 (Step S101). The dielectric breakdown control circuit 212 applies to memory cells included in the PUF space 211 a current or a voltage (hereinafter referred to as a dielectric breakdown current) that causes the dielectric breakdown to occur (Step S102). This application causes a dielectric breakdown to occur in MTJ elements in part of the memory cells in the PUF space 211, thus generating an ID of the chip fingerprint.

The read circuit 213 of the PUF circuit 21 performs a read operation from the PUF space 211 (Step S103). The read circuit 213 outputs to the CPU 3 via the output circuit 24 a value read from the PUF space 211 and an ID generation completion notification indicating that the ID generation has been completed (Step S104). The process is thereby terminated.

During the authentication of the electronic device, the ID is read from the PUF space 211 of the PUF circuit 21. The read ID is processed by software mounted in a processor, not illustrated, incorporated in the memory 2 or the server and is used as PUF authentication data.

As described above, in the first embodiment, the dielectric breakdown is intentionally caused to occur in the MTJ elements of the memory cells included in the space (PUF space 211) of part of the memory space 23 to thereby generate the ID. This arrangement achieves reduction in the memory space to be made available for the PUF. In addition, the ID generation process illustrated in FIG. 3 can be performed at any timing, for example, at the start of using the electronic device 1. This achieves an advantage of being capable of building an even more solid authentication system. For example, a configuration in which a user who purchases the electronic device 1 performs the process illustrated in FIG. 3 to generate an ID enables generation of an ID having high confidentiality, so that an even more solid authentication system can be built.

Second Embodiment

The following details, with reference to relevant accompanying drawings, a data generation apparatus, an electronic device, and an authentication system according to a second embodiment. In the following, like reference numerals denote like or corresponding elements as those described in the first embodiment and descriptions therefor will be omitted.

A method is available for further reducing the PUF space 211 illustrated in the first embodiment. This method uses a pair of MTJ elements for the PUF. For example, a difference in resistance exists in principle between the two paired up MTJ elements. Thus, when a current or a voltage satisfying a condition of causing a dielectric breakdown to occur simultaneously in the two paired up MTJ elements is applied, the dielectric breakdown occurs in either one of the MTJ elements.

Two methods may be illustrated as methods for pairing up two MTJ elements and causing a dielectric breakdown to occur in either one of the two MTJ elements: cross coupling (also known as cross inverter) and differential amplification. The cross coupling works as follows. Specifically, when a current having a predetermined value or higher is passed through the paired two MTJ elements, the dielectric breakdown occurs in a cell that is different from the other cell through which the current flowed first. The differential amplification works as follows. Specifically, when a current having a predetermined value or higher is passed through the paired two MTJ elements, the dielectric breakdown occurs in the cell through which the current flowed first, so that no current flows through the other cell.

The use of these two methods allows, even when the difference in resistance between the paired two MTJ elements is small, this difference to be amplified to cause the dielectric breakdown to occur in one of the memory cells and allows a current applied to the other memory cell to be reduced. The result enables easy differentiation between the memory cell in which the dielectric breakdown has occurred and the memory cell in which the dielectric breakdown has not occurred.

Reference is made to FIGS. 4A and 4B. An MTJ element 30 includes a free magnetic layer 31, a reference magnetic layer 33, and an insulation layer 32 interposed between the free magnetic layer 31 and the reference magnetic layer 33. The MTJ element 30 has a direction of magnetization, either parallel (see FIG. 4A) or anti-parallel (see FIG. 4B). In the parallel state illustrated in FIG. 4A, the MTJ element 30 is in a low resistance state. In the anti-parallel state illustrated in FIG. 4B, the MTJ element 30 is in a high resistance state. To use two MTJ elements 30 for the PUF through pairing, therefore, the direction of magnetization of the two paired MTJ elements 30 needs to be aligned into the parallel state (see FIG. 4A) to thereby place the MTJ elements 30 in the low resistance state.

The following describes, with reference to relevant accompanying drawings, an operation performed by a sense amplifier or a differential amplifier circuit reading bits from a pair of complementarily disposed memory cells. It should be noted that the following illustrates an operation in which the dielectric breakdown is caused to occur in the MTJ element by cross coupling using a sense amplifier. Nonetheless, the operation is similarly applicable to the differential amplification method.

FIG. 5 is a diagram for illustrating an exemplary operation performed by a sense amplifier that reads bits from a pair of complementarily disposed memory cells. As illustrated in FIG. 5, a memory space 23 includes a plurality of memory cells 41, 42, 43, 44, . . . . Of the memory cells 41, 42, 43, 44, . . . , the two adjacent memory cells 41 and 42 are defined as the paired memory cells in the PUF space 211 and are to be subjected to the dielectric breakdown.

To cause a dielectric breakdown to occur in the MTJ element included in one of the paired memory cells 41 and 42, a high voltage H is applied to the paired memory cells 41 and 42 and a low voltage L is applied to the other memory cells 43, 44, . . . . At this time, the direction of magnetization of the MTJ elements in the two paired memory cells 41 and 42 are aligned. Additionally, a power source voltage VDD is being applied from a power source control circuit 48 to a word line of the memory space 23.

When the high voltage H is kept applied to the two paired memory cells 41 and 42 as described above, a current starts to flow through an MTJ element having smaller resistance of the MTJ elements in the memory cells 41 and 42. This results in a higher voltage being applied to an MTJ element having high resistance for a long time. As a result, a dielectric breakdown occurs in the MTJ element having high resistance. A write-terminal circuit 130, for example, may be used to detect whether the dielectric breakdown has occurred in the MTJ element. When the write-terminal circuit 130 detects that the dielectric breakdown has occurred in the MTJ element in either one of the two paired memory cells 41 and 42, the supply of the power source voltage VDD from a power source control circuit 48 to each word line is terminated. This completes the application of a dielectric breakdown voltage to each of the memory cells 41 and 42.

To read data from the paired memory cells 41 and 42, a sense amplifier 47 performs the read operation on the memory cells 41 and 42 in the same manner as in ordinary reading. At this time, the output from the sense amplifier 47 (or the differential amplifier circuit) is set in advance to 0 or 1 depending on the specific memory cell out of the paired memory cells 41 and 42, in which the dielectric breakdown has occurred. This arrangement enables the output of the sense amplifier 47 to be set to 0 or 1 depending on whether the read operation is performed on the memory cell 41 or the memory cell 42.

As illustrated in FIG. 5, the pairing the two adjacent memory cells 41 and 42 allows minor variations in the two memory cells to be readily detected and a circuit area to be reduced considerably. Specifically, when the two adjacent memory cells are paired up, the ID bit can be read from each pair through the ordinary read operation performed by the sense amplifier. This capability allows a PUF circuit 21 to be incorporated in a memory 2 without the need to make a circuit design change.

Figure 6:
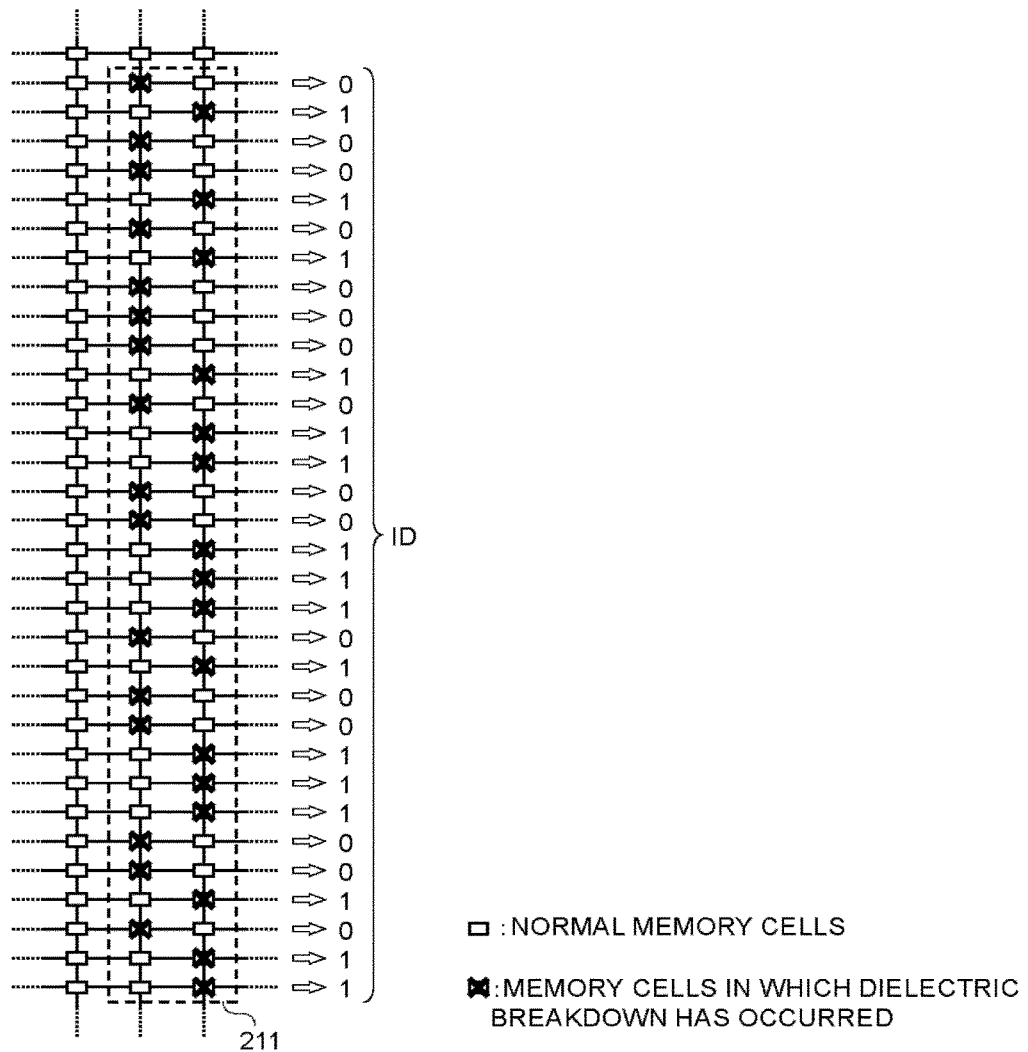
FIG. 6 is a diagram illustrating an exemplary PUF space set in a memory space in the second embodiment.

FIG. 6 is a diagram illustrating an exemplary PUF space set in a memory space in the second embodiment. With the method of causing the dielectric breakdown to occur in either one of the paired MTJ elements, the dielectric breakdown reliably occurs in one of the MTJ elements. Thus, as illustrated in FIG. 6, the number of memory cells required for use as the PUF can be reduced to a number that doubles the number of bits used in the PUF. Specifically, when 128-bit IDs are required for the PUF, for example, the PUF space 211 may be configured using 256 memory cells (MTJ elements).

It is noted that FIG. 6 illustrates the memory cells of the PUF space 211 are arrayed along the same word lines. Nonetheless, the bits required for the PUF, specifically, the PUF space 211 may be distributedly disposed in small blocks on a memory space.

Figure 7:
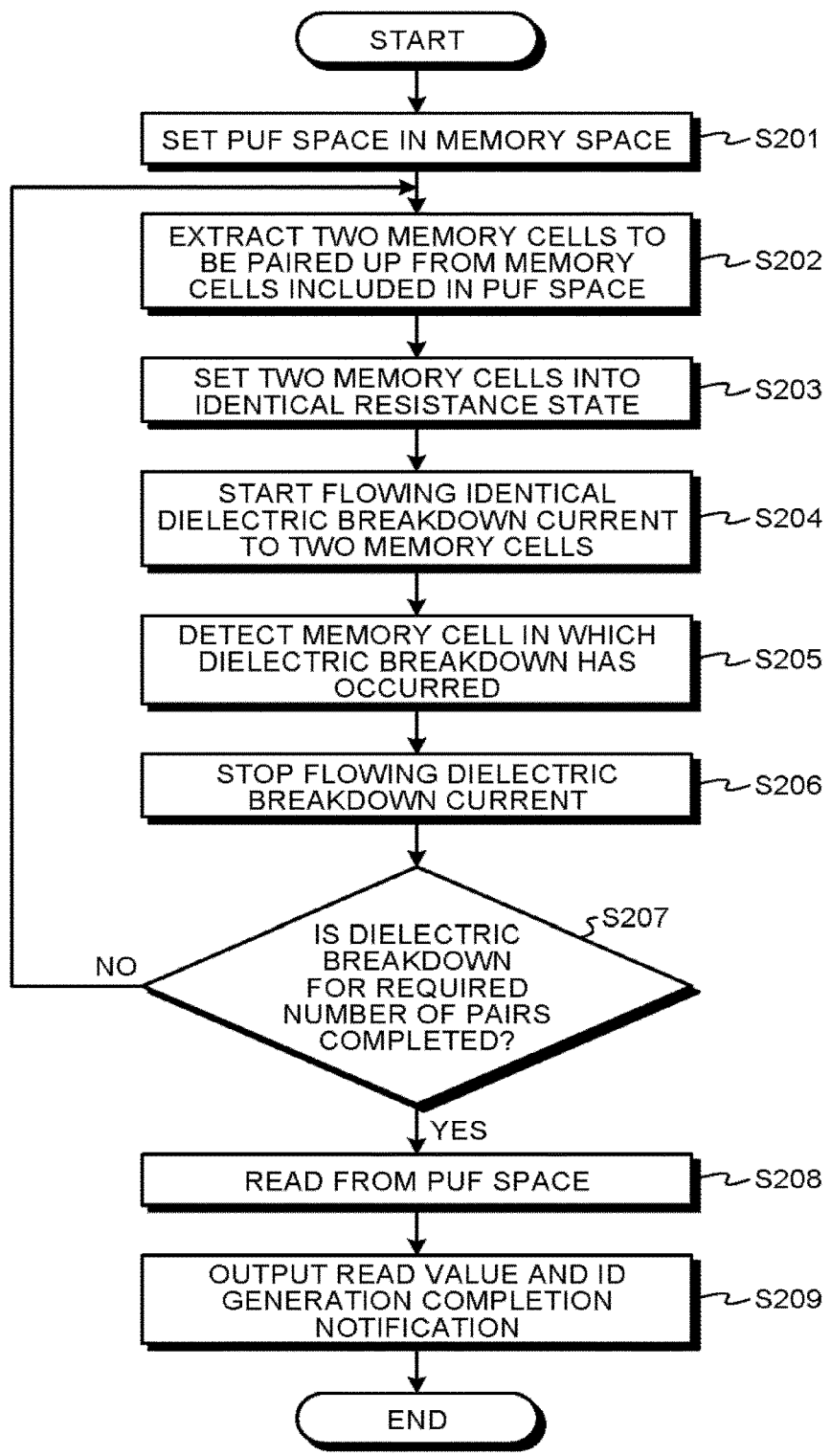
FIG. 7 is a flowchart illustrating an ID generation process according to the second embodiment.

An electronic device according to the second embodiment may have a configuration identical to the configuration of the electronic device 1 illustrated with reference to FIGS. 1 and 2 in the first embodiment. FIG. 7 is a flowchart illustrating an ID generation process according to the second embodiment. FIG. 7 focuses on operations performed by the PUF circuit 21 that has received an instruction to generate the ID from a security control circuit 6.

Reference is made to FIG. 7. In the ID generation process, when the PUF circuit 21 receives the instruction to generate the ID from the security control circuit 6, a dielectric breakdown control circuit 212 of the PUF circuit 21 sets part of a space of the memory space 23 as the PUF space 211 (Step S201). The PUF space 211 may be any partial space in the memory space 23, but is set as a space that includes a necessary and sufficient number of memory cells with respect to the number of pairs of memory cells required for generating the ID.

A dielectric breakdown control circuit 212 extracts two memory cells to be paired up from the memory cells included in the memory space 23 set as the PUF space 211 (Step S202). The extracted two memory cells are then set into an identical state in memory logic. To achieve that end, in the second embodiment, the dielectric breakdown control circuit 212 aligns magnetization orientations of the MTJ elements in the extracted two memory cells into a parallel or anti-parallel state (Step S203).

A condition of causing a dielectric breakdown to occur in the MTJ elements is given to the two extracted memory cells. In the second embodiment, the dielectric breakdown control circuit 212 causes an identical dielectric breakdown current to start flowing through the two extracted memory cells (Step S204). In this example, the dielectric breakdown is caused to occur in the MTJ element by a current flowing time. Thus, the dielectric breakdown current that is made to start flowing at Step S204 may be the same current value as that used for ordinary write operations.

A minor difference in resistance exists between the extracted two memory cells due to, for example, errors in manufacturing processes. The operation to pass the current, however, allows the sense amplifier or the differential amplifier circuit connected with these two memory cells to detect the minor difference in resistance between the two memory cells. As a result, a voltage applied to one of the two memory cells increases and accordingly a dielectric breakdown occurs in the one memory cell. When the write-terminal circuit 130 detects the dielectric breakdown in the memory cell (Step S205), the dielectric breakdown control circuit 212 terminates the passing of the dielectric breakdown current through the memory cell (Step S206). By causing the dielectric breakdown to occur in one of the two paired memory cells as described above, one bit out of bits constituting the ID can be set for the two memory cells.

The dielectric breakdown control circuit 212 determines whether the dielectric breakdown for the number of memory cell pairs required for generation of the ID (specifically, bit setting) is completed (Step S207). If it is determined that the dielectric breakdown is yet to be completed (No at Step S207), the process returns to Step S202 and steps are performed to execute the dielectric breakdown for the two memory cells to be paired up next. If it is determined that the dielectric breakdown is completed for the number of memory cell pairs required (Yes at Step S207), a read circuit 213 of the PUF circuit 21 performs a read operation from the PUF space 211 (Step S208) and outputs to a CPU 3 via an output circuit 24 a read value and an ID generation completion notification indicating that the ID generation has been completed (Step S209). The process is thereby terminated.

The performance of the foregoing process enables generation of the ID using the number of memory cells doubling the number of output bits required for the PUF. Assume, for example, that the number of pairs required for the generation of the ID at Step S207 is 128. Then, a 128-bit ID can be generated from 256 memory cells that represent twice as many as 128.

As described above, the second embodiment allows the number of memory cells to be made available as the PUF space 211, specifically, the memory space 23 to be reduced considerably. This advantage can achieve a data generation apparatus, an electronic device, and an authentication system capable of efficiently using the memory space without the need for complicated control.

Additionally, in the configuration illustrated in FIG. 5, each MTJ element 45 in each memory cell is connected with a selection transistor Q46 including an N-type metal-oxidesemiconductor field effect transistor (NMOS). Because the MTJ element 45 is disposed between the selection transistor Q46 and a semiconductor substrate on which the selection transistor Q46 is formed in such a configuration, the selection transistor Q46 can have a high threshold voltage, as affected by a substrate bias effect. To reduce the likelihood that the threshold voltage of the selection transistor Q46 will increase, a method is effective in which a current in a reverse direction is passed through the MTJ element 45.

In general, current flows from the selection transistor Q46 to the MTJ element 45. Thus, when the insulation layer 32 of the MTJ element 45 is to be weakened, potential is set so that the current flows from the MTJ element 45 to the selection transistor Q46. For example, keeping high potential on a ground (VSS) side with the VDD set as substrate potential in FIG. 5 allows the current to flow from the MTJ element 45 to the selection transistor Q46. In this case, because the substrate bias effect does not act, the current can be made to flow to the MTJ element 45 with an ordinary threshold voltage of the selection transistor Q46. When the ID is to be read from the memory cells 41 and 42, however, the current needs to flow from the selection transistor Q46 to the MTJ element 45. It is thus preferable that the current in the reverse direction be passed through the MTJ element 45 at an early stage of generating the ID.

Other configurations, operations, and effects are the same as those in the first embodiment and detailed descriptions therefor will be omitted.

Third Embodiment

The following details, with reference to relevant accompanying drawings, a data generation apparatus, an electronic device, and an authentication system according to a third embodiment. The third embodiment illustrates several examples of the cross coupling illustrated in the second embodiment. In the following, like reference numerals denote like or corresponding elements as those described in the above-described embodiment and descriptions therefor will be omitted.

First Example of Cross Coupling

Figure 8:
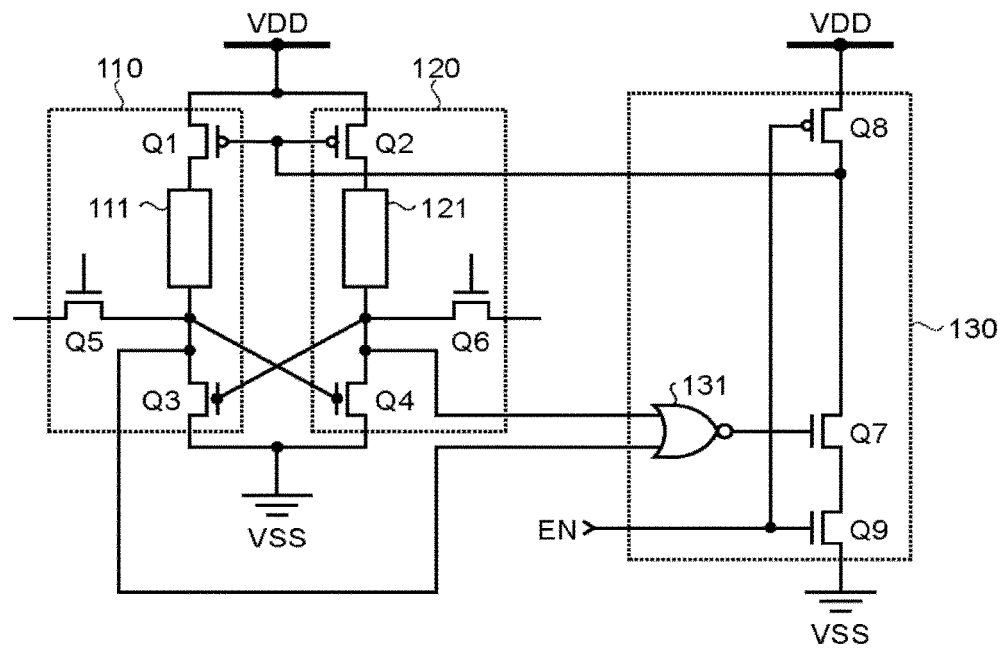
FIG. 8 is a schematic circuit diagram illustrating a schematic configuration of a memory cell according to a first example of cross coupling in a third embodiment.

FIG. 8 is a schematic circuit diagram illustrating a schematic configuration of a memory cell according to a first example of cross coupling. In the cross coupling configuration illustrated in FIG. 8, two paired up memory cells 110 and 120 are coupled to each other in an inverter loop and outputs thereof are connected to a write-terminal circuit 130.

The memory cell 110 includes a P-type metal-oxide-semiconductor field effect transistor (PMOS) (hereinafter referred to as a first transistor) Q1, an N-type metal-oxide-semiconductor field effect transistor (NMOS) (hereinafter referred to as a second transistor) Q3, an MTJ element 111, and an NMOS transistor (hereinafter referred to as a read transistor) Q5. More specifically, the second transistor Q3 constitutes a cross coupled inverter. The MTJ element 111 is connected between a drain of the first transistor Q1 and a drain of the second transistor Q3. The read transistor Q5 is connected with a wire that branches from a wire connecting the MTJ element 111 with the drain of the second transistor Q3. Similarly, the memory cell 120 includes first and second transistors Q2 and Q4, an MTJ element 121, and a read transistor Q6.

The write-terminal circuit 130 includes a NOR circuit 131, an NMOS transistor (hereinafter referred to as a termination transistor) Q7, a PMOS transistor Q8, and an NMOS transistor Q9. More specifically, the NOR circuit 131 receives outputs of the two memory cells 110 and 120. The termination transistor Q7 is turned ON or OFF depending on an output from the NOR circuit 131. The PMOS transistor Q8 and the NMOS transistor Q9 turn ON or OFF the first transistors Q1 and Q2, respectively, during writing (including dielectric breakdown) and reading to/from the memory cells 110 and 120. The termination transistor Q7 is connected between a drain of the PMOS transistor Q8 and a drain of the NMOS transistor Q9. Additionally, the PMOS transistor Q8 has a gate connected with a gate of the NMOS transistor Q9.

A gate of the PMOS transistor Q1 of the memory cell 110 and a gate of the PMOS transistor Q2 of the memory cell 120 are connected with each other and connected with a wire that connects the drain of the PMOS transistor Q8 with a drain of the NMOS transistor Q7 in the write-terminal circuit 130. The path between each of the MTJ elements 111 and 121 and a drain of each of the NMOS transistors Q3 and Q4 in the respective memory cells 110 and 120 is branched, and connected with a gate of each of the second transistors Q4 and Q3 in the respective memory cells 120 and 110 and connected with respective inputs of the NOR circuit 131 in the write-terminal circuit 130.

When a dielectric breakdown is to be caused to occur in the MTJ element 111 or the MTJ element 121, an enable signal EN is applied to the gates of the PMOS transistor Q8 and the NMOS transistor Q9 in the write-terminal circuit 130. This signal application turns ON the NMOS transistor Q9 and turns OFF the PMOS transistor Q8, thereby turning ON the first transistors Q1 and Q2 in the respective memory cells 110 and 120. In a condition in which the first transistors Q1 and Q2 are turned ON, an identical current (dielectric breakdown current) flows through each of the MTJ elements 111 and 121 in the respective memory cells 110 and 120. When the current is kept flowing for longer than the current flow time in an ordinary write mode, or when the value of the current to be passed is gradually increased, a greater amount of current flows through the MTJ element having a lower resistance value (assumed here to be the MTJ element 111) of the MTJ elements 111 and 121.

When the MTJ element 111 has a resistance higher than the resistance of the MTJ element 121, drain potential of the second transistor Q4 in the memory cell 120 is higher than drain potential of the second transistor Q3 in the memory cell 110. This increases gate potential of the second transistor Q3 in the memory cell 110, resulting in reduced drain potential of the second transistor Q3. Then, gate potential of the second transistor Q4 in the memory cell 120 further decreases, resulting in the drain potential of the second transistor Q4 further increasing. As a result, gate potential of the second transistor Q3 in the memory cell 110 further increases. Because the foregoing process is a feedback process, the second transistor Q3 of the memory cell 110 eventually turns ON and the second transistor Q4 of the memory cell 120 turns OFF. As a result, a large voltage is applied to the MTJ element 111 of the memory cell 110, so that a dielectric breakdown occurs in the MTJ element 111. It is noted that, when the MTJ element 121 in the memory cell 120 has a resistance higher than the resistance of the MTJ element 111 in the memory cell 110, a large voltage is applied to the MTJ element 121, causing a dielectric breakdown to occur in the MTJ element 121.

Assume that a bit value (hereinafter referred to as a PUF value) of an ID formed by the two paired memory cells 110 and 120 is set, in advance, to be "1" when, for example, the dielectric breakdown occurs in the MTJ element 111 of the memory cell 110 and to be "0" when the dielectric breakdown occurs in the MTJ element 121 in the memory cell 120. This advance setting of the PUF value enables the PUF value for one bit to be obtained through performance of a read operation on the two paired memory cells 110 and 120. Because which cell of the MTJ element 111 or the MTJ element 121 has a lower resistance depends on, for example, variations in initial manufacturing processes, the determination of the PUF value as described above enables formation of an unpredictable PUF value.

When the dielectric breakdown has occurred in either one of the MTJ elements 111 and 121, the termination transistor Q7 in the write-terminal circuit 130 turns OFF and the first transistors Q1 and Q2 of the respective memory cells 110 and 120 turn OFF. This stops the flow of the dielectric breakdown current to the MTJ elements 111 and 121.

To read the PUF value from the two paired memory cells 110 and 120, the enable signal EN is applied to the gates of the PMOS transistor Q8 and the NMOS transistor Q9 in the write-terminal circuit 130 and, in the condition in which the first transistors Q1 and Q2 in the respective memory cells 110 and 120 are turned ON, the values of the memory cells 110 and 120 are read via the read transistors Q5 and Q6 in the respective memory cells 110 and 120. The PUF value is thereby acquired.

Second Example of Cross Coupling

Figure 9:
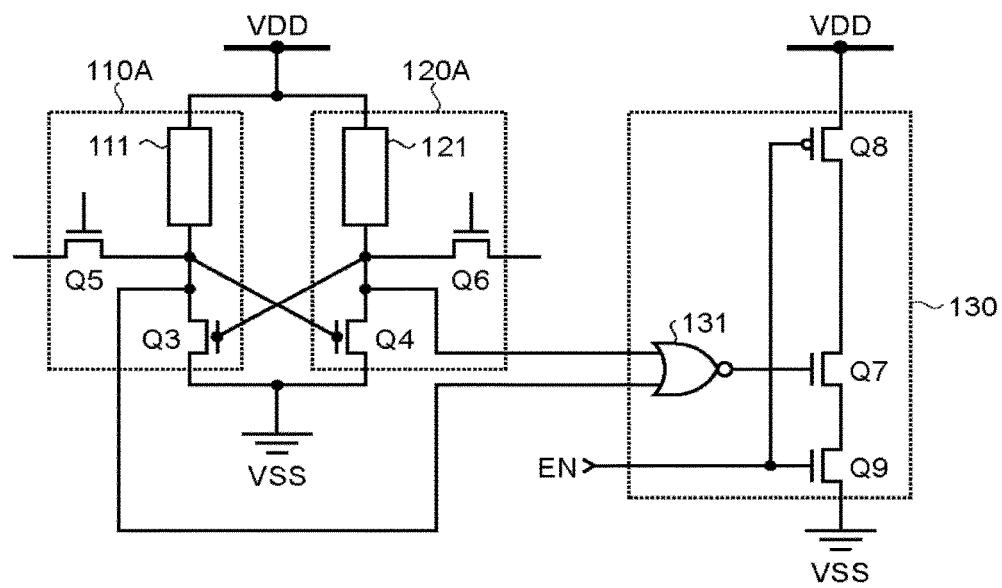
FIG. 9 is a schematic circuit diagram illustrating a schematic configuration of a memory cell according to a second example of cross coupling in the third embodiment.

FIG. 9 is a schematic circuit diagram illustrating a schematic configuration of a memory cell according to a second example of cross coupling. As illustrated in FIG. 9, in a configuration identical to the configuration of each of the memory cells 110 and 120 in the first example of cross coupling, the first transistors Q1 and Q2 are omitted in respective memory cells 110A and 120A according to the second example of cross coupling. In such a configuration, second transistors Q3 and Q4 in the respective memory cells control the dielectric breakdown current to be passed through respective MTJ elements 111 and 121.

Third Example of Cross Coupling

Figure 10:
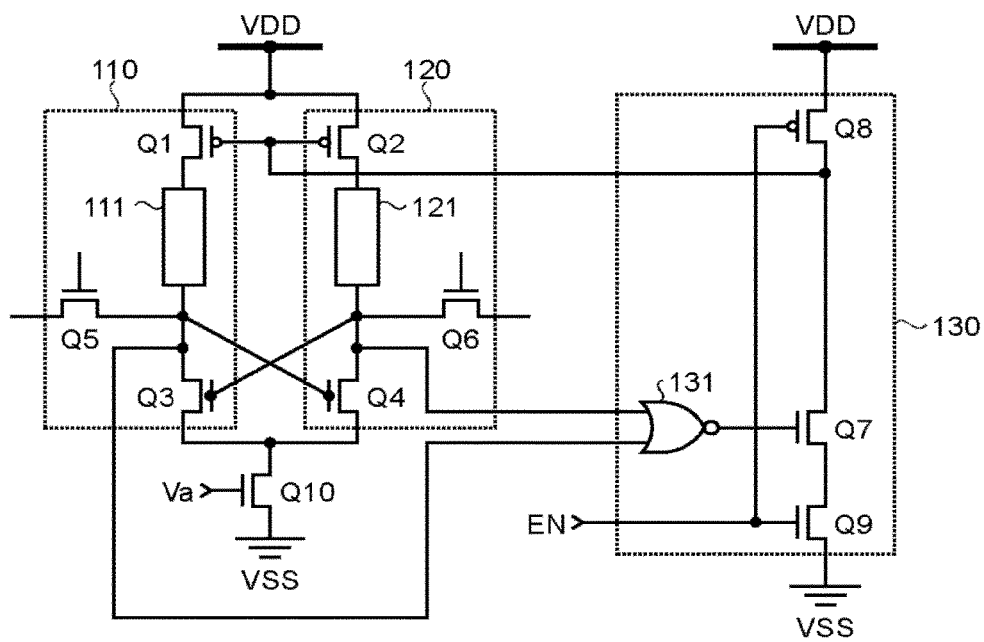
FIG. 10 is a schematic circuit diagram illustrating a schematic configuration of a memory cell according to a third example of cross coupling in the third embodiment.

FIG. 10 is a schematic circuit diagram illustrating a schematic configuration of a memory cell according to a third example of cross coupling in the third embodiment. As illustrated in FIG. 10, memory cells 110 and 120 in the third example of cross coupling each have a configuration identical to the configuration of each of the memory cells 110 and 120 according to the first example of cross coupling. It should, however, be noted that second transistors Q3 and Q4 in the respective memory cells 110 and 120 are connected with a ground (VSS) via a common NMOS transistor Q10. In such a configuration, first transistors Q1 and Q2 in the respective memory cells control the dielectric breakdown current to be passed through respective MTJ elements 111 and 121, as in the first example of cross coupling. It should, however, be noted that the NMOS transistor Q10 disposed between each of the second transistors Q3 and Q4 and the ground (VSS) functions as a potential control transistor. Specifically, the dielectric breakdown current to be passed through each of the MTJ elements 111 and 121 can be adjusted by adjusting gate potential Va of the NMOS transistor Q10.

In the first through third examples of cross coupling described above, a soft breakdown mode can occur in which, during the process of causing the dielectric breakdown to occur, the dielectric breakdown occurs only halfway in the MTJ element 111 or the MTJ element 121. In the third embodiment, however, even when the soft breakdown occurs, that very soft breakdown causes an even greater amount of current to flow, so that the dielectric breakdown can be reliably caused to occur in either one of the MTJ elements.

In the first through third examples of cross coupling described above, when the difference in resistance between the MTJ elements 111 and 121 is smaller than a variation in the threshold voltage between the second transistors Q3 and Q4 in the respective memory cells 110 and 120, the difference in the threshold voltage between the second transistors Q3 and Q4 can cause a breakdown to occur in either one of the MTJ elements 111 and 121. Even in this case, the very variation in the threshold voltage between the second transistors Q3 and Q4 serves as an origin of the PUF value and the PUF functions satisfactorily.

Expression (1) given below assumes a condition for detecting the difference when the difference in resistance between the MTJ elements 111 and 121 is greater than the difference in the threshold voltage between the second transistors Q3 and Q4. In expression (1), $V_{T1}$ and $V_{T2}$ denote the threshold voltages of the second transistors Q3 and Q4, respectively, and $\beta$ denotes a value determined by $\mu CW/L$ (where, $\mu$ denotes mobility, C denotes gate capacitance, and W and L denote width and length, respectively, of the gate).

$$1/R_2 - 1/R_1 > \beta(V_{T1} - V_{T2}) \tag{1}$$

Additionally, the first through third examples of cross coupling have been described for a configuration of the write-terminal circuit 130 that turns ON or OFF the flow of the dielectric breakdown current to each of the MTJ elements 111 and 121 including the three transistors (Q7 to Q9). The configuration is, however, illustrative only and a more complicated circuit may be employed. Additionally, the output from either one of the read transistors Q5 and Q6 in the respective memory cells 110 and 120 may, for example, be written in another space (also referred to as a second space) in a memory space 23. This arrangement eliminates, in subsequent operations, the reading of the ID from a PUF space 211.

Other configurations, operations, and effects are the same as those in the above-described embodiments and detailed descriptions therefor will be omitted.

Fourth Embodiment

The following details, with reference to relevant accompanying drawings, a data generation apparatus, an electronic device, and an authentication system according to a fourth embodiment. The fourth embodiment illustrates several examples of the differential amplification illustrated in the second embodiment. In the following, like reference numerals denote like or corresponding elements as those described in the above-described embodiments and descriptions therefor will be omitted.

Figure 11:
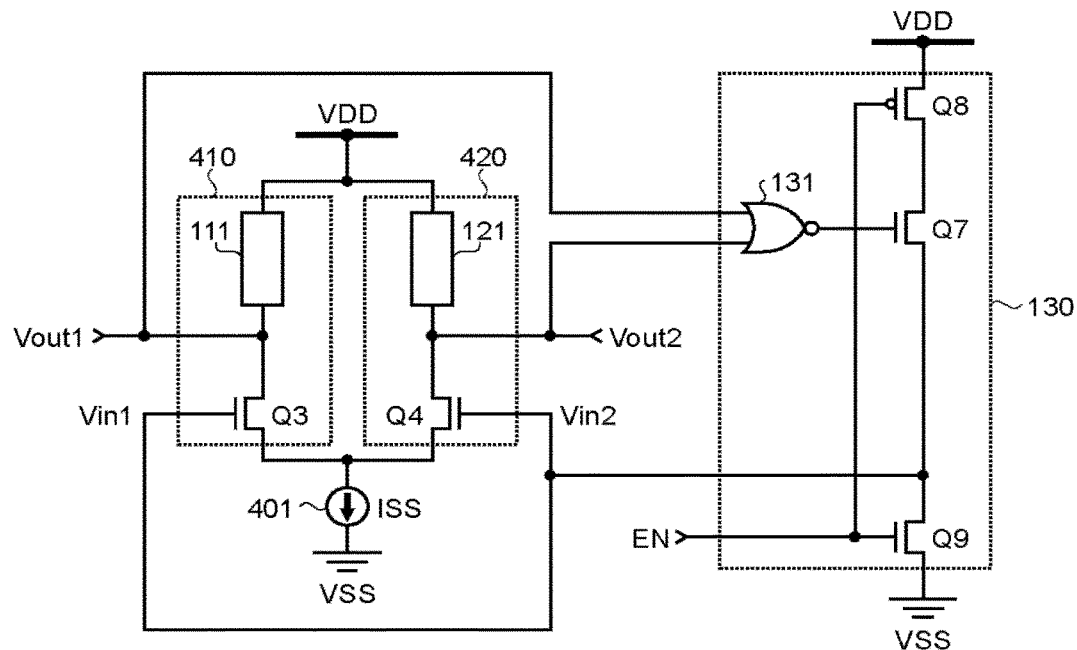
FIG. 11 is a schematic circuit diagram illustrating a schematic configuration of a memory cell according to a fourth embodiment.

FIG. 11 is a schematic circuit diagram illustrating a schematic configuration of a memory cell by differential amplification. In the differential amplification configuration illustrated in FIG. 11, outputs from two paired memory cells 410 and 420 are each connected to a write-terminal circuit 130.

The memory cell 410 includes an MTJ element 111 and an NMOS transistor Q3 (corresponding to the second transistor Q3 in the third embodiment). Similarly, the memory cell 420 includes an MTJ element 121 and an NMOS transistor Q4 (corresponding to the second transistor Q4 in the third embodiment). The NMOS transistors Q3 and Q4 in the respective memory cells 410 and 420 have gates coupled to each other to constitute a differential amplifier circuit. The differential amplifier circuit has a common gate connected to a wire that connects a source of a termination transistor Q7 with a drain of an NMOS transistor Q9 in the write-terminal circuit 130.

A wire between each of the MTJ elements 111 and 121 and a drain of each of the NMOS transistors Q3 and Q4 is branched and connected with respective inputs of a NOR circuit 131 in the write-terminal circuit 130. A source of each of the NMOS transistors Q3 and Q4 in the respective memory cells 410 and 420 is connected to a ground (VSS) via a constant-current circuit 401.

To cause a dielectric breakdown to occur in the MTJ element 111 or the MTJ element 121, an inverted value of an enable signal EN is applied to a gate of each of a PMOS transistor Q8 and the NMOS transistor Q9 in the write-terminal circuit 130. This application turns OFF the NMOS transistor Q9 and turns ON the PMOS transistor Q8, thereby turning ON the NMOS transistors Q3 and Q4 in the respective memory cells 410 and 420. In a condition in which the NMOS transistors Q3 and Q4 are turned ON, an identical current (dielectric breakdown current) flows through each of the MTJ elements 111 and 121 in the respective memory cells 410 and 420. When the current is kept flowing for longer than the current flow time in the ordinary write mode, or when the value of the current to be passed is gradually increased, a greater amount of current flows through the MTJ element having a lower resistance value (assumed here to be the MTJ element 121) of the MTJ elements 111 and 121. It is here noted that a current ISS flowing through a semiconductor substrate via the constant-current circuit 401 remains constant. Thus, a greater amount of current flowing through the MTJ element 121 results in a relatively smaller amount of current flowing through the MTJ element 111. This process is more conspicuous as the breakdown progresses further in the MTJ element 121. As a result, a dielectric breakdown is caused to occur in the MTJ element 121. After the dielectric breakdown of the MTJ element 121, most of the dielectric breakdown current flowing from a power source voltage VDD flows into the MTJ element 121, so that the MTJ element 111 is protected.

When the dielectric breakdown has occurred in either one of the MTJ elements 111 and 121 as described above, the termination transistor Q7 in the write-terminal circuit 130 turns OFF and the NMOS transistors Q3 and Q4 in the respective memory cells 410 and 420 turn OFF. This stops the flow of the dielectric breakdown current into the MTJ elements 111 and 121.

To read a PUF value from the two paired memory cells 410 and 420, the enable signal EN is input to gates of the PMOS transistor Q8 and the NMOS transistor Q9 in the write-terminal circuit 130 to thereby turn ON the NMOS transistors Q3 and Q4 in the respective memory cells 410 and 420. A current is thereby fed to the MTJ elements 111 and 121, so that voltage values of outputs Vout1 and Vout2 are obtained. From a combination of the two outputs Vout1 and Vout2, the PUF value of the two paired memory cells 410 and 420 can be obtained.

As in the third embodiment, the outputs Vout1 and Vout2 from the respective memory cells 410 and 420 may, for example, be written in another space (also referred to as a second space) in a memory space 23. This arrangement eliminates, in subsequent operations, the reading of the ID from a PUF space 211.

Other configurations, operations, and effects are the same as those in the above-described embodiments and detailed descriptions therefor will be omitted.

Fifth Embodiment

The following details, with reference to relevant accompanying drawings, a data generation apparatus, an electronic device, and an authentication system according to a fifth embodiment. The fifth embodiment illustrates several other examples of memory cells according to the differential amplification illustrated in the fourth embodiment. In the following, memory cell configurations are excerpted and elaborated. Additionally, in the following, like reference numerals denote like or corresponding elements as those described in the above-described embodiments and descriptions therefor will be omitted.

First Other Example of Differential Amplification

Figure 12:
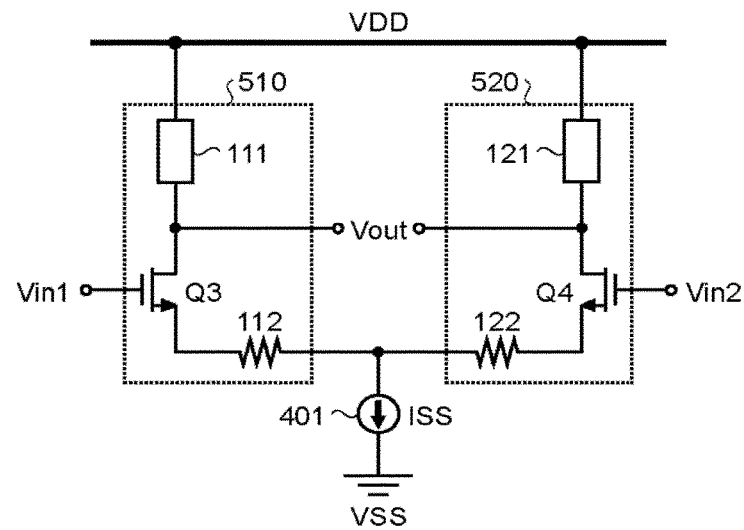
FIG. 12 is a schematic circuit diagram illustrating a schematic configuration of a memory cell according to a first other example of differential amplification in a fifth embodiment.

FIG. 12 is a schematic circuit diagram illustrating a schematic configuration of a memory cell according to a first other example of differential amplification. In the configuration illustrated in FIG. 12, memory cells 510 and 520 include MTJ elements 111 and 121, NMOS transistors Q3 and Q4 (corresponding to the second transistors Q3 and Q4 in the third embodiment), and constant-resistance elements 112 and 122, respectively. The NMOS transistor Q3 has a source connected with a source of the NMOS transistor Q4 via the constant-resistance elements 112 and 122. A node wire connecting the two constant-resistance elements 112 and 122 is connected with a ground (VSS) via a constant-current circuit 401. In the foregoing configuration, too, the NMOS transistors Q3 and Q4 in the respective memory cells 510 and 520 have gates coupled to each other to constitute a differential amplifier circuit.

Second Other Example of Differential Amplification

Figure 13:
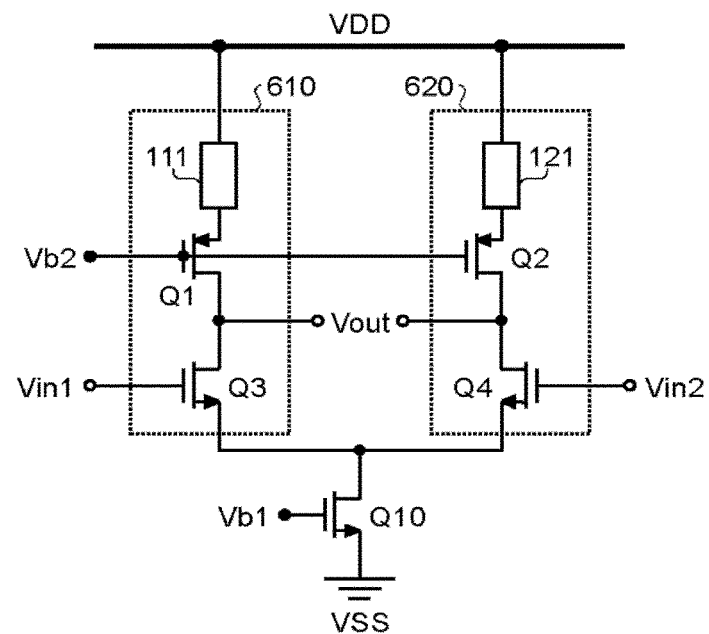
FIG. 13 is a schematic circuit diagram illustrating a schematic configuration of a memory cell according to a second other example of differential amplification in the fifth embodiment.

FIG. 13 is a schematic circuit diagram illustrating a schematic configuration of a memory cell according to a second other example of differential amplification. In the configuration illustrated in FIG. 13, memory cells 610 and 620 include first transistors Q1 and Q2, second transistors Q3 and Q4, and MTJ elements 111 and 121, respectively. The second transistors Q3 and Q4 are connected with a ground (VSS) via a common NMOS transistor Q10. In the foregoing configuration, too, the second transistors Q3 and Q4 in the respective memory cells 610 and 620 have gates coupled to each other to constitute a differential amplifier circuit.

Third Other Example of Differential Amplification

Figure 14:
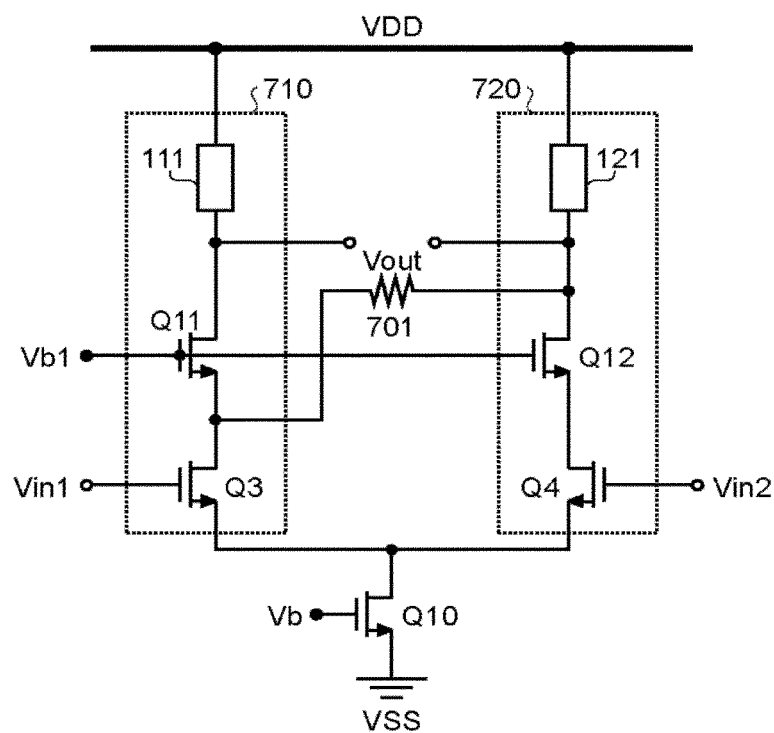
FIG. 14 is a schematic circuit diagram illustrating a schematic configuration of a memory cell according to a third other example of differential amplification in the fifth embodiment.

FIG. 14 is a schematic circuit diagram illustrating a schematic configuration of a memory cell according to a third other example of differential amplification. In the configuration illustrated in FIG. 14, memory cells 710 and 720 include NMOS transistors Q3 and Q4, NMOS transistors Q11 and Q12, and MTJ elements 111 and 121, respectively. The NMOS transistors Q3 and Q4 are connected with a ground (VSS) via a common NMOS transistor Q10. Additionally, a wire that connects a source of the NMOS transistor Q11 with a drain of the NMOS transistor Q3 in the memory cell 710 is connected via a resistor 701 with a wire that connects the MTJ element 121 with the NMOS transistor Q12 in the memory cell 720. In the foregoing configuration, too, the NMOS transistors Q3 and Q4 in the respective memory cells 710 and 720 have gates coupled to each other to constitute a differential amplifier circuit.

Fourth Other Example of Differential Amplification

Figure 15:
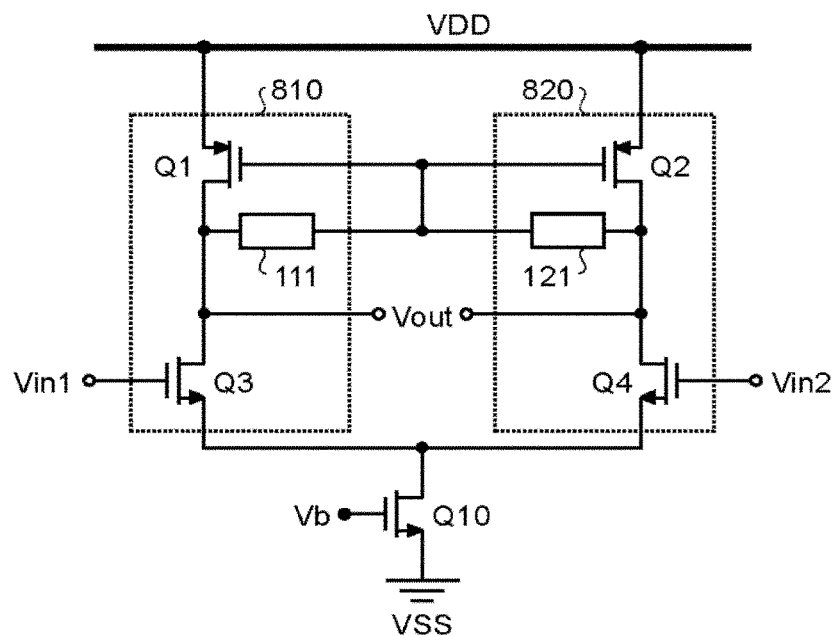
FIG. 15 is a schematic circuit diagram illustrating a schematic configuration of a memory cell according to a fourth other example of differential amplification in the fifth embodiment.

FIG. 15 is a schematic circuit diagram illustrating a schematic configuration of a memory cell according to a fourth other example of differential amplification. In the configuration illustrated in FIG. 15, memory cells 810 and 820 include MTJ elements 111 and 121, first transistors Q1 and Q2, and second transistors Q3 and Q4, respectively. The MTJ element 111 is connected in series with a wire that connects a drain of the first transistor Q1 and a drain of the second transistor Q3 in the memory cell 810. Similarly, the MTJ element 121 is connected in series with a wire that connects a drain of the first transistor Q2 and a drain of the second transistor Q4 in the memory cell 820. A wire that connects between the MTJ elements 111 and 121 is branched and connected with gates of the respective first transistors Q1 and Q2. The second transistors Q3 and Q4 are connected with a ground (VSS) via a common NMOS transistor Q10. In the foregoing configuration, too, the second transistors Q3 and Q4 in the respective memory cells 810 and 820 have gates coupled to each other to constitute a differential amplifier circuit.

Fifth Other Example of Differential Amplification

Figure 16:
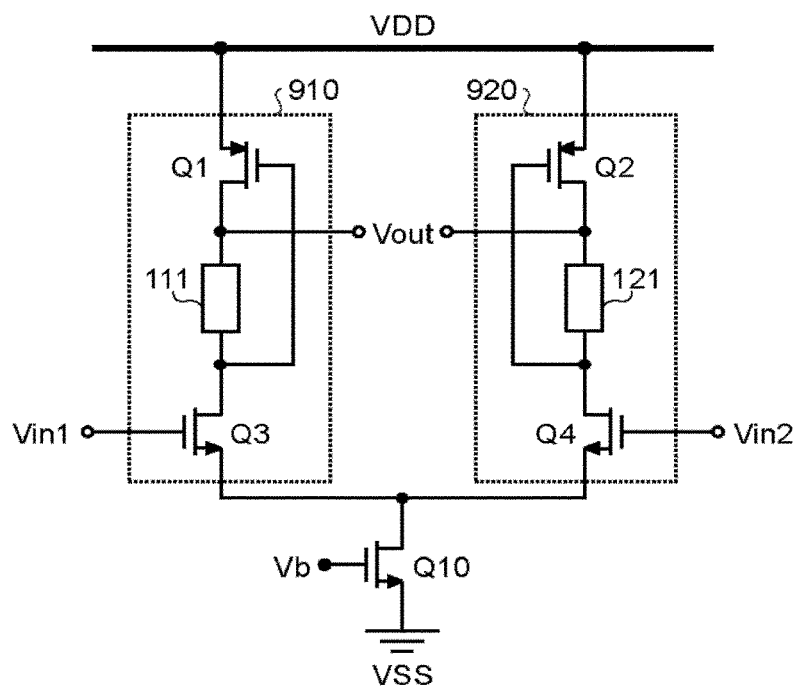
FIG. 16 is a schematic circuit diagram illustrating a schematic configuration of a memory cell according to a fifth other example of differential amplification in the fifth embodiment.

FIG. 16 is a schematic circuit diagram illustrating a schematic configuration of a memory cell according to a fifth other example of differential amplification. In the configuration illustrated in FIG. 16, memory cells 910 and 920 include first transistors Q1 and Q2, MTJ elements 111 and 121, and second transistors Q3 and Q4, respectively. The second transistors Q3 and Q4 are connected with a ground (VSS) via a common NMOS transistor Q10. Additionally, wires that connect the MTJ elements 111 and 121 and the second transistors Q3 and Q4, respectively, are branched and connected with respective gates of the first transistors Q1 and Q2. In the foregoing configuration, too, the second transistors Q3 and Q4 in the respective memory cells 910 and 920 have gates coupled to each other to constitute a differential amplifier circuit.

By disposing memory cells, each having an identical configuration, bilaterally symmetrically as in the first to fifth other examples of differential amplification described above, a PUF unit cell in which minor differences in manufacturing processes are incorporated can be manufactured.

Other configurations, operations, and effects are the same as those in the above-described embodiments and detailed descriptions therefor will be omitted.

In this specification, the write-terminal circuit has been described to be operative to detect a change in the cell output as illustrated, for example, by the write-terminal circuit 130 of FIG. 5. The write-terminal circuit may, instead, be operative to detect a change in the input current (denoted simply as VDD in this specification). More specifically, the current value before breakdown is stored as, for example, capacitance and a change with respect to the voltage is detected to thereby detect a dielectric breakdown of the MTJ element. Alternatively, a read circuit disclosed in Yiran Chen, Hai Li, Xiaobin Wang, Wenzhong Zhu, Wei Xu, and Tong Zhang, "A Nondestructive Self-Reference Scheme for Spin-Transfer Torque Random Access Memory (STT-RAM)", design; paper presented at the Automation & Test in Europe Conference and Exhibition, Dresden, Germany may be applied.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data generation apparatus comprising:
   a memory space including a plurality of memory cells, each including a resistance change element;
   a first circuit configured to supply the memory cells included in a first space that represents part of the memory space with a current or a voltage that causes a dielectric breakdown to occur in the resistance change element;
   a second circuit configured to output a value read from the memory cells included in the first space; and
   an ID generation circuit configured to generate an ID using the value output from the second circuit, wherein
   the plurality of memory cells include pairs of memory cells, the pairs each including a first memory cell and a second memory cell,
   the first circuit causes a dielectric breakdown to occur in the resistance change element in either the first memory cell or the second memory cell of each pair of memory cells,
   the second circuit determines a bit value using values read from the first memory cell and the second memory cell of each pair of memory cells, and
   the ID generation circuit generates the ID using the bit value determined by the second circuit.

2. The data generation apparatus according to claim 1, wherein the first circuit controls a value or a flow time of the current or a value or an application time of the voltage to cause a dielectric breakdown to occur in the resistance change element in the memory cell included in the first space.

3. The data generation apparatus according to claim 1, wherein the ID generation circuit identifies an address of a memory cell in which a dielectric breakdown occurs in the resistance change element using the value output from the second circuit and generates the ID using the identified address.

4. The data generation apparatus according to claim 1, wherein
   the first memory cell and the second memory cell each include a transistor,
   the resistance change element in each of the first memory cell and the second memory cell is connected with the transistor, and
   the transistor of each of first memory cell and the second memory cell is cross-coupled to the other such that a terminal of the transistor of the first cell connected with the resistance change element is connected with a gate of the transistor of the second cell, and a terminal of the transistor of the second cell connected with the resistance change element is connected with a gate of the transistor of the first cell.

5. The data generation apparatus according to claim 1, wherein
   the first memory cell and the second memory cell include transistors having gates coupled to each other to constitute a differential amplifier circuit, and
   the resistance change element in each of the first memory cell and the second memory cell is connected with the transistor.

6. The data generation apparatus according to claim 1, further comprising:
   a third circuit configured to detect that a dielectric breakdown has occurred in the resistance change element, wherein
   when the third circuit detects that a dielectric breakdown has occurred in the resistance change element, the first circuit stops the supply of the current or the voltage.

7. The data generation apparatus according to claim 1, wherein the resistance change element includes a magnetic resistive junction.

8. The data generation apparatus according to claim 1, wherein the ID generation circuit stores the generated ID in a second space that is different from the first space in the memory space.

9. The data generation apparatus according to claim 1, wherein the first memory cell and the second memory cell are adjacent to each other.

* * * * *